United States Patent
Wolfinger

[11] 4,002,058
[45] Jan. 11, 1977

[54] METHOD AND APPARATUS FOR VIBRATION OF A SPECIMEN BY CONTROLLED ELECTROMAGNETIC FORCE

[75] Inventor: John F. Wolfinger, Schenectady, N.Y.

[73] Assignee: General Electric Company, Schenectady, N.Y.

[22] Filed: Mar. 3, 1976

[21] Appl. No.: 663,491

[52] U.S. Cl. .............................. 73/71.5 R; 73/67.4
[51] Int. Cl.² .................. G01M 7/00; G01N 29/00
[58] Field of Search .......... 73/67, 67.2, 67.3, 67.4, 73/71.6, 71.5 R

[56] References Cited

UNITED STATES PATENTS

| | | | |
|---|---|---|---|
| 2,788,659 | 4/1957 | Radnar et al. ................... | 73/67.4 |
| 3,015,949 | 1/1962 | Arnold ........................... | 73/71.5 R |
| 3,501,952 | 3/1970 | Gergen et al. ................... | 73/67.2 X |

Primary Examiner—Donald O. Woodiel
Assistant Examiner—John P. Beauchamp
Attorney, Agent, or Firm—John F. Ahern; James W. Mitchell

[57] ABSTRACT

Method and apparatus for applying controlled electromagnetic force to a test specimen such as a turbine bucket to induce vibration in the specimen. The force is applied by means of an electromagnetic field produced by an electromagnet. A controlled power source supplies current to the electromagnet to maintain the applied force at a predetermined magnitude over a predetermined range of frequencies. A comparator controls the power source in response to a sensor signal representative of the frequency and magnitude of the force actually applied so as to maintain at a minimum the difference between this signal and a reference signal representative of a desired frequency and magnitude. Tuning means are provided to nullify capacitive reactance of the electromagnet which would otherwise tend to limit the current supplied by the power source as frequency is increased.

7 Claims, 3 Drawing Figures

METHOD AND APPARATUS FOR VIBRATION OF A SPECIMEN BY CONTROLLED ELECTROMAGNETIC FORCE

BACKGROUND OF THE INVENTION

1. Field of the Invention

This invention relates to a method and apparatus for effecting vibration of a test specimen. In particular, this invention relates to a method and apparatus for applying a controlled electromagnetic force to a turbine bucket to induce vibration of the bucket over a predetermined range of frequencies.

2. Description of the Prior Art

Numerous systems have been developed for vibration of test specimens to determine such specimen characteristics as natural resonant frequencies and resistance to fatigue failure. One of the most useful techniques involves utilizing an electromagnetic field to induce vibration since physical attachment to the specimen, which might alter characteristics to be determined or limit testing to static specimens, is not required. This is generally accomplished by exciting an electromagnet at a desired frequency and locating the specimen in the field generated thereby. To date, however, systems employing this technique have not effected control over force applied to the specimen to the degree necessary to optimize obtainable information.

Although previous techniques employing control of applied force in response to signals from force measurement sensors are known, these systems are limited to use at a single frequency or at a slowly changing frequency such as the primary natural resonant frequency of the specimen, which changes slowly as the specimen fatigues.

Previous systems are limited not only in the amount of useful information obtainable at a single frequency, but also in the amount of force available to be applied. The amount of force available is a function of electromagnet current and this current tends to decrease as frequency is increased when the power source is a typical electronic power amplifier, because of an accompanying increase in inductive reactance.

The apparatus of the present invention overcomes all of the aforementioned limitations by providing controlled application of electromagnetic force to a test specimen over a wide range of frequencies. Applied force is maintained at a desired level at any particular frequency within this range or as the frequency rapidly changes within this range. Control of applied force is maintained without the necessity of placing sensor devices in contact with the specimen, although sensor devices (e.g., accelerometers) may be attached to obtain information in addition to that derived from non-contacting sensor devices. Further, the available force has been maximized by inclusion of circuitry which automatically nullifies electromagnet inductive reactance at any frequency within the range of operation.

SUMMARY OF THE INVENTION

Method and apparatus are provided for applying a controlled electromagnetic force, at a frequency variable over a predetermined range, to a test specimen such as a turbine bucket to effect vibration of the specimen. The apparatus includes an electromagnet for applying the force to the specimen, a controlled power source for applying voltage to develop excitation current in the electromagnet and means for sensing the applied force. The sensing means develops a first electrical signal having a magnitude and frequency representative of that of the applied force (in the embodiment of the invention discussed herein the electrical signal developed is representative of the applied force in that it is one half thereof and has a relation thereto of 1 to 2); a suitable signal generator such as a Wavetek Instruments Model 142 produces a reference electrical signal of predetermined constant magnitude at a frequency that varies over a predermined range; and a comparator compares the first signal with the reference signal. The comparator controls the power source and regulates the magnitude of the voltage applied to the electromagnet to maintain the difference between the compared signals at a minimum. The sensing means may include a non-contacting type sensor such as a pickup coil located in the magnetic field generated by the electromagnet.

The apparatus further includes a tuning device connected between the power source and the electromagnet for canceling the inductive reactance of the electromagnet over a wide frequency range. The tuning device is controlled by a phase detector comprised of a flip-flop, a low-pass filter, and an operational amplifier which produces an output voltage proportional to the phase angle between power source voltage and electromagnet current and which operates to keep power source voltage in phase with electromagnet current.

DESCRIPTION OF A PREFERRED EMBODIMENT

In a preferred embodiment of the invention, vibratory displacement of a test specimen, and more particularly a turbine bucket, is induced by an electromagnetic field generated by an electromagnet placed in close proximity to the bucket. Vibration may be induced into either a single stationary bucket or one or more buckets repeatedly passed through the field. In addition, such buckets may be mounted on a rotating wheel with the magnet and pickup mounted nearby and connected outside by means of slip rings. For purposes of simplifying the following description, however, only a single stationary blade will be referred to.

Figure 1:
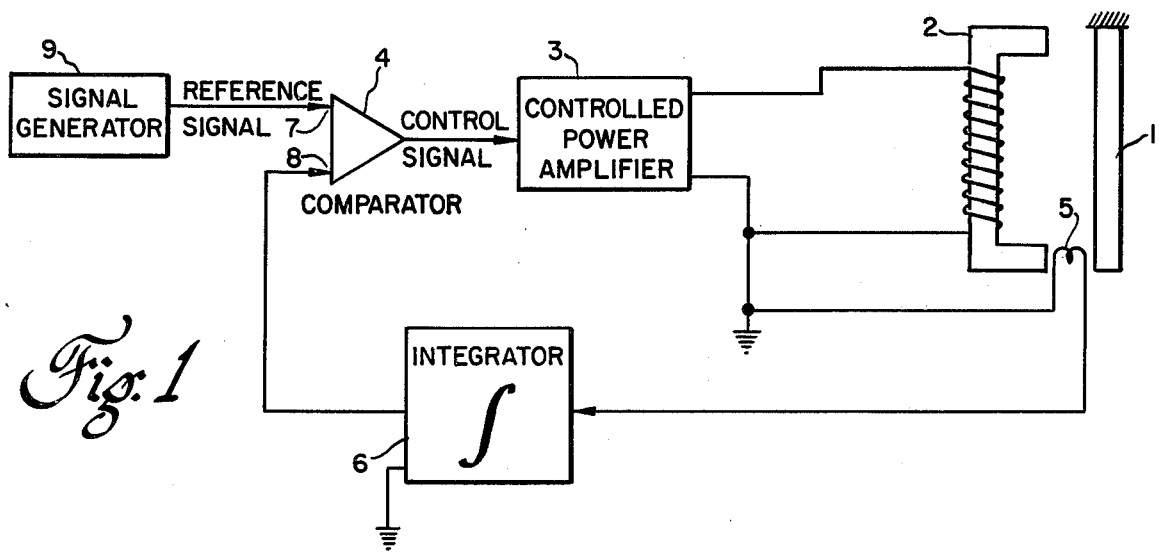
FIG. 1 is a schematic diagram of the apparatus of this invention for applying a controlled electromagnetic force to a test specimen.

Referring to FIG. 1, vibration is induced in turbine bucket 1 by force exerted by an electromagnetic field generated by electromagnet 2. Excitation current is established in the electromagnet by a voltage applied to the electromagnet by a suitable controlled power amplifier 3 connected thereto. One such amplifier is a Bogen Model NTB-250. The magnitude of the applied voltage is regulated by a control signal developed by a comparator 4. A pickup coil 5 is placed in an air gap between the electromagnet and the turbine bucket to sense the rate of change of magnetic flux in the field generated by the electromagnet. The pickup coil produces a signal having a voltage proportional to the rate of change of flux. The pickup coil signal is applied to an integrator comprising a type 741 operational amplifier along with an appropriate resistor-capacitor network 6 which develops an output voltage having a magnitude proportional to the flux density in the air gap. The force applied to the blade is proportional to the square of the flux density and the signal developed by the integrator is thus representative of the force applied to the blade by the electromagnetic field.

The signal from the integrator is applied to a first input 8 of the comparator 4. A reference electrical signal developed by a signal generator 9 is applied to a second comparator input 7. The signal generator produces a reference signal of a predetermined magnitude at a frequency varying over a predetermined range. The comparator functions in such a manner as to develop the control signal which varies in accordance with any momentary difference between the two signals applied to its inputs. The control signal is applied to the power amplifier to effect regulation of the magnitude of the voltage applied to the electromagnet to maintain the difference between the comparator input signals at a minimum. Thus, the comparator effects control of the electromagnetic force applied to the blade so that this force follows a desired pattern corresponding to the pattern of the reference signal, resulting in an input to the comparator from the integrator which closely resembles the reference signal.

In essence, the signal produced by the reference signal generator is a representation of a type of vibratory force it is desired to apply to the turbine bucket. The variety of forces that might be applied is limited only by operating limitations of specific equipment utilized to implement the apparatus of FIG. 1. For example, a particular test useful in obtaining information relating to multiple resonant frequencies of a bucket might be conducted by applying alternating vibratory forces of a constant magnitude at frequencies swept over a predetermined range and monitoring the frequencies at which the greatest bucket displacement occurs.

It is to be noted that no physical contact need be made to the specimen either to effect vibration or to measure characteristics relating to the displacement of the bucket, although such physical contact by such devices as accelerometers to obtain additional information is not precluded by use of the present invention.

Figure 2:
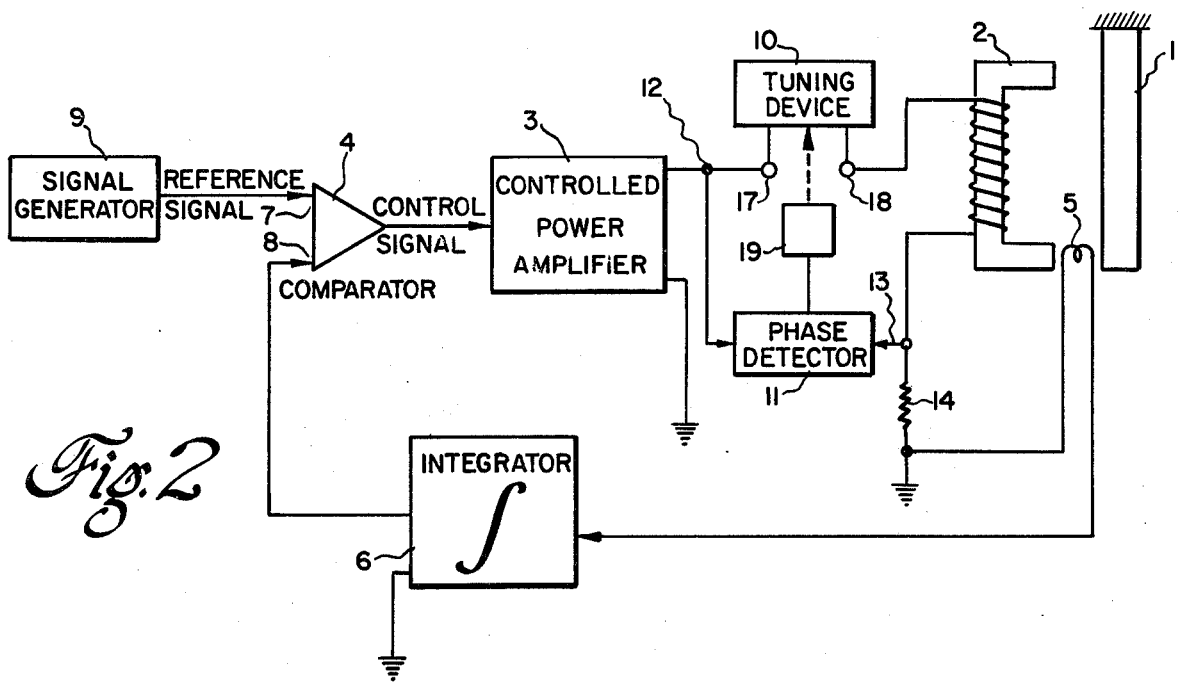
FIG. 2 is a schematic diagram of the apparatus of this invention including a tuning device for nullifying electromagnet inductive reactance.

In FIG. 2 elements have been added to cancel the inductive reactance of the electromagnet. Normally, an increase in inductive reactance of the electromagnet occurs as excitation frequency increases. This increased reactance limits maximum excitation current deliverable by the power amplifier. To counteract the inductive reactance a tuning device 10 is connected in series between the power amplifier 3 and the electromagnet 2. The tuning device has a variable capacitive reactance that automatically cancels the inductive reactance of the electromagnet at any frequency within the range of operation of the apparatus.

The tuning device is controlled by a phase detector 11 comprised of a flip-flop that is set by a zero crossing of the voltage signal and reset by a zero crossing of the electromagnet current signal thus producing a periodic output signal of rectangular shape, the average value of which is obtained by means of a low-pass filter and is proportional to the phase difference of the two signals. The phase detector measures and compares the phase of power amplifier voltage measured at 12 with the phase of electromagnet current. A simple means for determining electromagnet current phase is illustrated. Electromagnet current is returned to ground through resistor 14 and the voltage drop across the resistor is monitored at 13. Since the voltage and current of the resistor are in phase, the phase of the voltage at 13 is identical with the phase of the electromagnet current.

Whenever the amplifier voltage and electromagnet current begin to shift out of phase with each other, the detector develops a correction signal. Such a phase shift would momentarily occur when electromagnet inductive reactance changes as a result of a variation in excitation frequency. The correction signal is applied to an electric motor 19 which mechanically adjusts the tuning device to maintain cancellation of the inductive reactance and preserve the in-phase voltage/current relationship.

Figure 3:
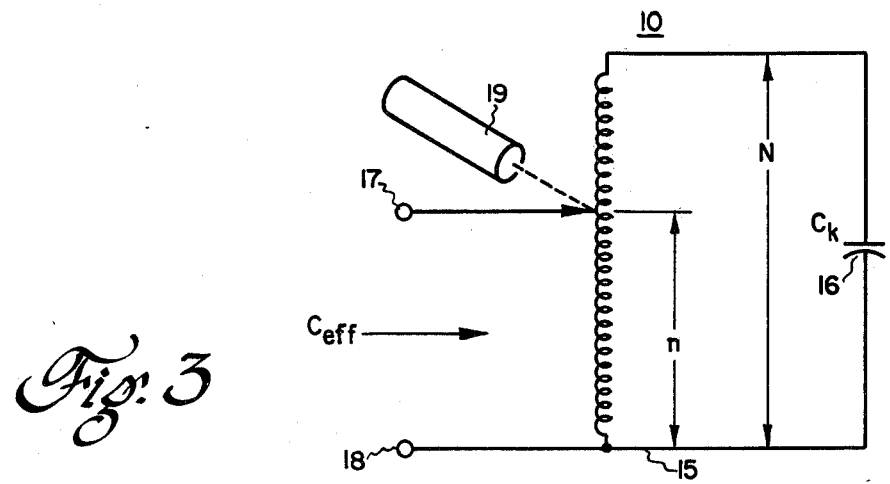
FIG. 3 is a specific embodiment of a tuning device which may be employed in the apparatus of FIG. 2.

Typically, a very large capacitor (e.g., 1–10MF or more) is needed to provide canceling capacitive reactance at the frequencies of interest (e.g., 20Hz to 20Hz). FIG. 3 illustrates a tuning device having the requisite high capacitive reactance. An autotransformer 15 having a single winding of N turns is connected in parallel with a capacitor 16 having capacitance $C_k$. A terminal 17 of the tuning device is connected to a movable winding tap. A terminal 18 is connected to one end of the winding. Effective capacitance $C_{eff}$ measurable across terminals 17 and 18 is directly related to capacitance $C_k$ by the inverse of the square of a ratio of the number of turns n between terminals 17, 18 and the total number of turns N, by the equation:

$$C_{eff} = \frac{C_k}{(n/N)^2}$$

If we let: $r^2 = (n/N)^2$ the equation reduces to:

$$C_{eff} = \frac{1}{r^2} C_k \qquad (1)$$

For the required cancellation, that is, where capacitive reactance ($X_c$) of the tuning device is equal to inductive reactance ($X_L$) of the electromagnet the following condition must be met:

$$X_c = X_L$$

$$\frac{1}{2\pi f C} = 2\pi f L$$

$$C = \frac{1}{(2\pi f)2_L}$$

where $f$ is electromagnet excitation frequency.

Since inductance L of the electromagnet is essentially constant, the equation expressing required capacitance C to cancel inductive reactance reduces to:

$$C = \frac{1}{f^2} K \qquad (2)$$

where K is a constant. By comparing equations (1) and (2) it can be seen that $C_{eff}$ of the tuning device varies with changing autotransformer turns ratio $r$ in exactly the same manner as the capacitance C required to nullify inductive reactance varies with changing excitation frequency $f$, that is by the inverse of the power two. Thus, the autotransformer turns ratio required to cancel inductive reactance is directly proportional to excitation frequency and this ratio is varied by adjusting the position of the movable tap under control of a phase detector as previously described.

In summary, vibration of a test specimen such as a turbine bucket over a predetermined range of frequencies is induced by applying controlled electromagnetic force. A device such as an electromagnet is utilized to generate an electromagnetic field to apply the force to the specimen. The flux density of the electromagnetic field is measured and a sensing device develops a first electrical signal having a magnitude and frequency representative of that of the applied force. A signal generator produces a reference electrical signal of predetermined magnitude at frequencies varying over a predetermined range. The first signal and the reference signal are applied to inputs of a comparator which develops a control signal. This control signal is utilized to effect regulation of the frequency and magnitude of the field to maintain the difference between the compared signals at a minimum. Provision may also be made for cancellation of inductive reactance of the electromagnet as frequency varies over the predetermined range.

It will be appreciated from the above description that the present invention overcomes deficiencies of prior art systems for control of electromagnetically induced vibration. Information obtainable during vibration testing is optimized because of the close control of forces applied to the specimen. Accurate control of applied forces is maintained over a wide range of frequencies. The available vibratory force is maximized by cancellation of electromagnet inductive reactance which normally tends to limit electromagnet current as excitation frequency is increased. The variety of tests that can be performed is limited only by operating limitations of specific equipment utilized to implement the method and apparatus of the invention.

Although a specific embodiment of a method and apparatus for applying controlled electromagnetic force to effect vibration of a test specimen has been described, it is not intended that the invention be limited to this embodiment. Rather, it is intended that the invention include variations obvious to those skilled in the art which fall within the scope of the appended claims.

What is claimed is:

1. An apparatus for applying controlled electromagnetic force to a test specimen over a predetermined range of electromagnet excitation frequencies to effect vibration of the specimen comprising:
   a. an electromagnet for producing an electromagnetic field to apply the force to the test specimen;
   b. a controlled electrical power source connected to the electromagnet for applying a regulated voltage thereto and establishing excitation current therein;
   c. a comparator for developing a control signal and applying this signal to the power source to effect regulation of the magnitude of the voltage applied to the electromagnet, said comparator having first and second inputs;
   d. sensing means for measuring the flux density of the electromagnetic field and developing a first electrical signal having a magnitude and frequency representative of that of the applied force;
   e. a signal generator for producing a reference electrical signal of predetermined magnitude at frequencies varying over a predetermined range;
   f. said first signal and said reference signal being applied to the first and second comparator inputs, respectively, said comparator effecting comparison of the signals for developing the control signal and applying the control signal to the power source to effect regulation of the magnitude of the voltage applied to the electromagnet to maintain the difference between the compared signals at a minimum.

2. An apparatus as in claim 1, wherein the sensing means comprises:
   a. a pickup coil disposed in the electromagnetic field for sensing the rate of change of magnetic flux in the field and for producing an electrical signal having a magnitude proportional to this rate of change; and
   b. an integrator for receiving the signal produced by the pickup coil and for developing therefrom said first electrical signal having a magnitude proportional to field flux density.

3. An apparatus as in claim 2, wherein the pickup coil is placed in an air gap between the electromagnet and the test specimen and where the coil makes no physical contact with the specimen.

4. An apparatus as in claim 1, and further including:
   a. a tuning device connected in electrical series with the electromagnet and the power source for nullifying inductive reactance of the electromagnet over the predetermined range of excitation frequencies;
   b. a phase detector for measuring and comparing the phase of the power source voltage and the phase of electromagnet current and developing a corrective electrical signal whenever a change in electromagnet inductive reactance causes a phase difference to exist; and
   c. means for adjusting the tuning device in response to the correction signal to eliminate the phase difference.

5. An apparatus as in claim 4, wherein the tuning device comprises a variable capacitance.

6. An apparatus as in claim 5, wherein the variable capacitance comprises:
   a. an autotransformer, including a winding having a terminal at one end thereof and a movable tap in contact with the winding;
   b. fixed capacitor connected in electrical parallel with the winding; and
   c. electromechanical means physically connected to the tap for moving said tap to adjust capacitive reactance between the terminal and the tap to an amount necessary to nullify the inductive reactance of the electromagnet as excitation frequency is varied.

7. A method for applying a controlled electromagnetic force to a test specimen to effect vibration of the specimen over a predetermined range of frequencies including the steps of:
   a. generating an electromagnetic field to apply the force to the specimen;
   b. measuring the flux density of the electromagnetic field and developing a first electrical signal having a magnitude and frequency representative of that of the applied force;
   c. providing a reference electrical signal of predetermined magnitude at frequencies varying over a predetermined range;
   d. comparing the first signal with the reference signal and developing a control signal; and
   e. employing the control signal to effect regulation of the magnitude of the field to maintain the difference between the compared signals at a minimum.

* * * * *